UNITED STATES PATENT OFFICE.

WILLIAM F. NIEDRINGHAUS, OF ST. LOUIS, MISSOURI.

IMPROVEMENT IN PROCESSES OF ENAMELING SHEET-IRON WARE.

Specification forming part of Letters Patent No. 193,669, dated July 31, 1877; application filed June 11, 1877.

*To all whom it may concern:*

Be it known that I, WILLIAM F. NIEDRINGHAUS, a resident of St. Louis, Missouri, have made a new and useful Improvement in the Process of Enameling Sheet-Metal Ware, of which the following is a full, clear, and exact description.

Hitherto in enameling sheet-metal ware it has been customary, after the ware has been withdrawn from the baking-oven, to allow it to cool off freely in the open air.

I have ascertained in my experience as enameler that the practice referred to is detrimental. To fuse the enamel upon the iron base, the ware must, as is well understood, be carried to a high degree of heat. In cooling down from this high temperature the iron base naturally contracts in a much longer ratio than the now-formed enamel-coating, especially when the latter is essentially a glass, the kind I preferably employ. Now, if the cooling operation is allowed to proceed rapidly the iron chills and shrinks before the enamel has become properly incorporated in and attached to it, and in consequence the enamel is not reliably adhesive, but, in use, splinters off.

To meet this difficulty I prolong the cooling of the ware as long as is practicable, my practice being as follows: As soon as the ware, after withdrawing it from the baking-oven, can, by suitable appliances, be handled without injury to the enamel, and while the ware is yet in a highly-heated state it is placed where the surrounding air is of the same temperature with the ware. It is then cooled down very slowly, the operation lasting from four to six hours.

In practice an ordinary glass annealing-furnace may be used.

This retardation of the cooling of the ware renders the enamel itself more malleable; but it is especially valuable in that it prevents any disturbance of the intimate union that exists between the iron and the enamel when the ware is withdrawn from the baking-oven, and which union is materially weakened when the ware is allowed to cool rapidly.

I claim—

The herein-described improvement in the mode of enameling sheet-metal ware by subjecting such ware, after withdrawing it from the baking-oven, to a process of slow cooling, substantially as described.

WM. F. NIEDRINGHAUS.

Witnesses:
CHAS. D. MOODY,
SAML. S. BOYD.